(12) United States Patent
Domazet et al.

(10) Patent No.: US 7,537,241 B2
(45) Date of Patent: May 26, 2009

(54) INFLATOR WITH AN AUTO-IGNITION CRADLE

(75) Inventors: Slaven Domazet, Sterling Heights, MI (US); Eduardo L. Quioc, Westland, MI (US); Sean P. Burns, Almont, MI (US)

(73) Assignee: TK Holdings, Inc., Armada, WI (US)

( * ) Notice: Subject to any disclaimer, the term of this patent is extended or adjusted under 35 U.S.C. 154(b) by 0 days.

(21) Appl. No.: 11/986,602

(22) Filed: Nov. 23, 2007

(65) Prior Publication Data

US 2008/0122207 A1 May 29, 2008

Related U.S. Application Data

(60) Provisional application No. 60/860,701, filed on Nov. 22, 2006.

(51) Int. Cl.
*B60R 21/26* (2006.01)
(52) U.S. Cl. ........................ 280/741; 280/736
(58) Field of Classification Search ................. 280/741, 280/736, 742; 102/530, 531
See application file for complete search history.

(56) References Cited

U.S. PATENT DOCUMENTS

| | | | | |
|---|---|---|---|---|
| 4,561,675 A | * | 12/1985 | Adams et al. | 280/734 |
| 5,350,193 A | * | 9/1994 | Murashima et al. | 280/741 |
| 5,439,250 A | * | 8/1995 | Kokeguchi et al. | 280/736 |
| 5,468,017 A | * | 11/1995 | Kirsch et al. | 280/741 |
| 5,501,152 A | * | 3/1996 | Zeuner et al. | 102/292 |
| 5,571,271 A | * | 11/1996 | Kobari et al. | 280/741 |
| 6,126,197 A | * | 10/2000 | Muir et al. | 280/741 |
| 6,474,684 B1 | * | 11/2002 | Ludwig et al. | 280/741 |
| 7,267,365 B2 | * | 9/2007 | Quioc | 280/736 |
| 2005/0263994 A1 | * | 12/2005 | Quioc | 280/741 |
| 2007/0108751 A1 | * | 5/2007 | Mayville et al. | 280/741 |

* cited by examiner

*Primary Examiner*—Ruth Ilan
*Assistant Examiner*—Drew J. Brown
(74) *Attorney, Agent, or Firm*—L. C. Begin & Associates, PLLC.

(57) ABSTRACT

A gas generating system includes an inflator that contains an auto-ignition cradle containing an auto-ignition composition. The cradle operatively and thermodynamically communicates with the exterior of the inflator and also resiliently contains the auto-ignition composition, thereby maximizing the ignitability of the auto-ignition composition in the event of a fire.

8 Claims, 3 Drawing Sheets

INFLATOR WITH AN AUTO-IGNITION CRADLE

CROSS REFERENCE TO RELATED APPLICATIONS

This application claims the benefit of provisional application Ser. No. 60/860,701 filed on Nov. 22, 2006.

BACKGROUND OF THE INVENTION

The present invention relates to gas generating systems and, more particularly, to an gas generating system for inflating an inflatable element of a vehicle occupant protection system, the gas generating system incorporating an assembly for housing an auto-ignition composition in intimate contact with the booster composition.

Many inflators incorporate auto-ignition compositions that provide enhanced safety of the gas generator/inflator in the event of a fire during shipping or storage of the Vehicle, for example, or during any car fire. Typically, the auto-ignition composition is formulated to auto-ignite at temperatures below the melting point of the other compositions associated with the inflator, including the booster composition and the main gas generating composition. In some inflators, the auto-ignition composition may not provide sufficient exposure to the booster propellant to ensure sufficient ignition of the main gas generant in accordance with improving the safety of the inflator. In the absence of an effective auto-ignition mechanism, the main gas generant in its melt phase could potentially provide an overly energetic system thereby resulting in safety concerns.

SUMMARY OF THE INVENTION

An inflator is provided that responds to the above-referenced concerns by employing an auto-ignition assembly or cradle that facilitates assured contact between the auto-ignition composition and the booster composition. The auto-ignition cradle is designed to advantageously utilize a thermodynamic relationship between the housing or exterior of the inflator, and the cradle itself. As such, the auto-ignition cradle in an operative state thermodynamically communicates with the housing of the inflator or directly with the exterior of the inflator. Once heat surrounding the inflator reaches a predetermined threshold temperature, the auto-ignition cradle in thermodynamic communication with that heat, provides assured ignition of the auto-ignition composition that alternatively provides rapid and substantially uniform heating of the booster composition.

The present invention therefore, includes an inflator that contains an auto-ignition cradle extending within an interior of the inflator. An auto-ignition composition is housed within the cradle and held there by a bias provided by the design of the cradle. A booster composition is intimately exposed to the auto-ignition material whereby once the cradle is heated to produce ignition of the auto-ignition composition, the booster composition is efficiently brought to combustion thereby also efficiently bringing the main gas generant composition to combustion prior to any substantial melt of the gas generant composition.

DETAILED DESCRIPTION

A gas generating system includes an inflator that contains an auto-ignition cradle containing an auto-ignition composition. The cradle operatively and thermodynamically communicates with the exterior of the inflator and also resiliently contains the auto-ignition composition, thereby maximizing the ignitability of the auto-ignition composition in the event of a fire.

Figure 1:
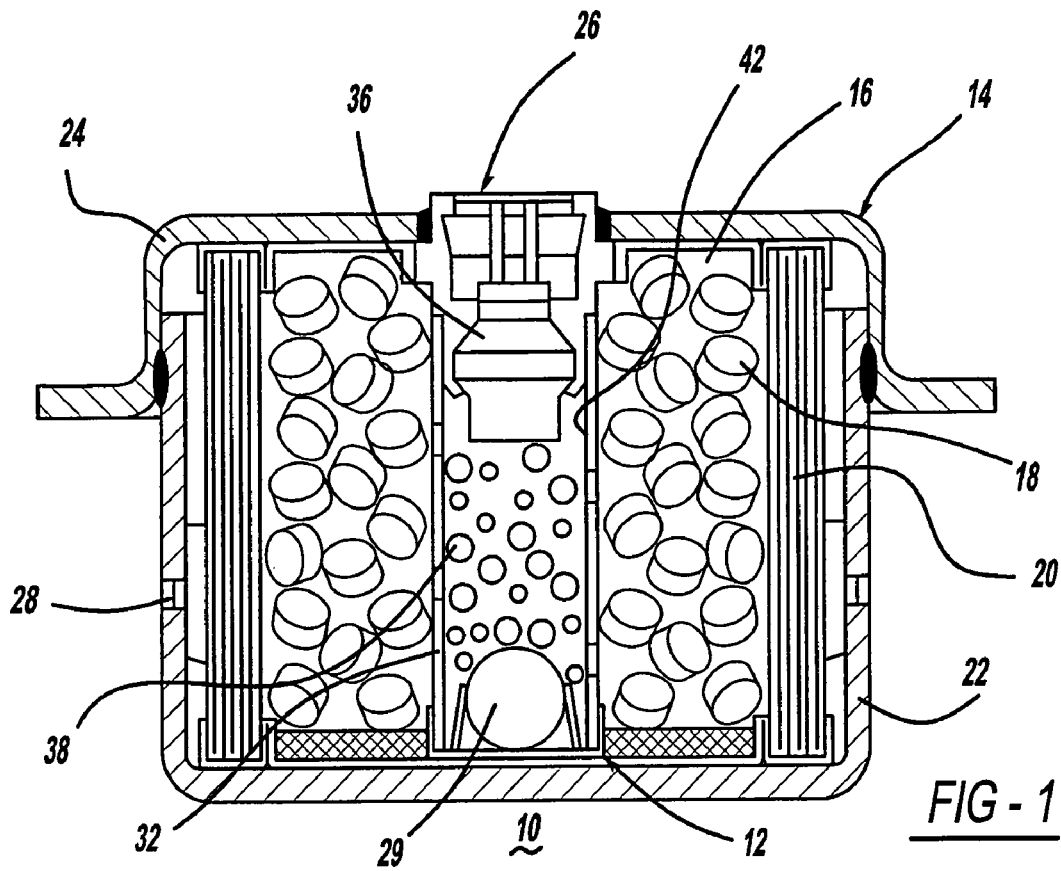
FIGS. 1-3 are cross-sectional side views of an inflator incorporating an auto-ignition cradle in accordance with the present invention.
Figure 2:
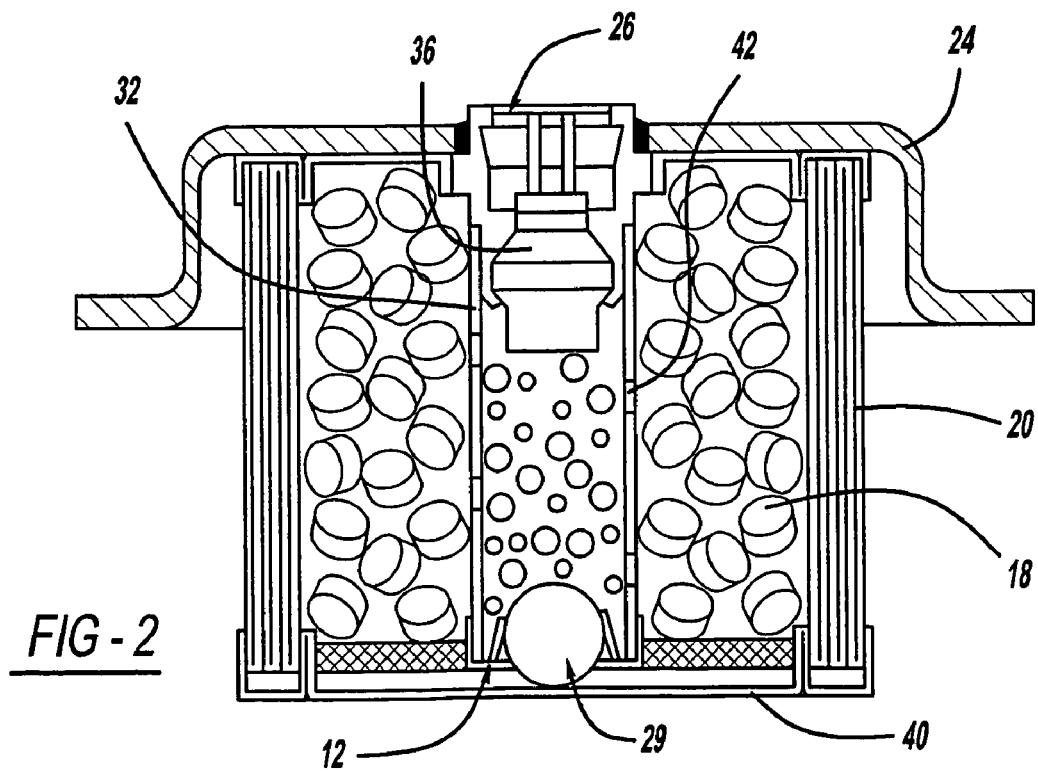
Figure 3:
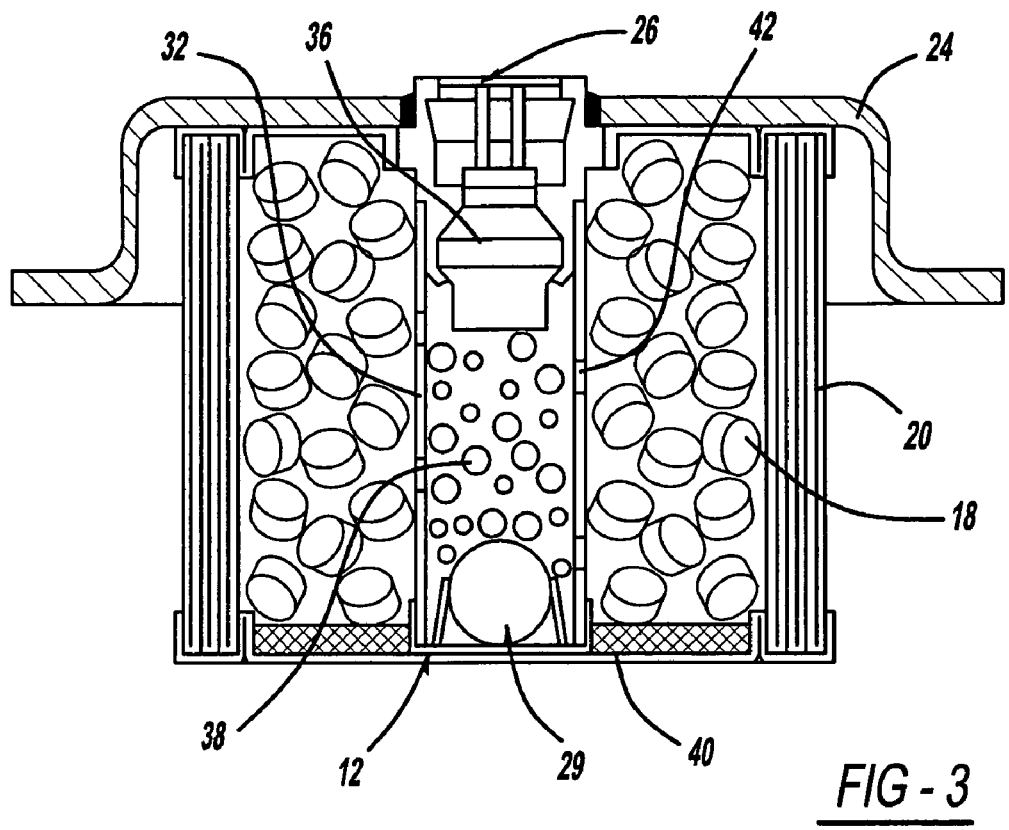
Figure 4:
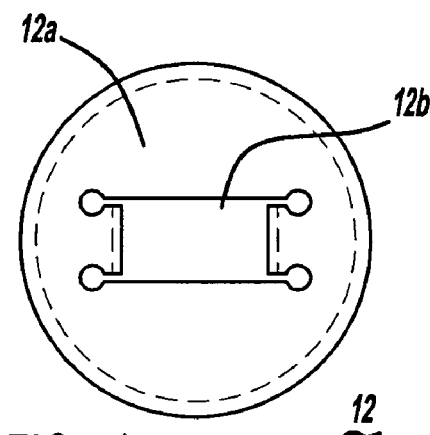
FIG. 4 is a plan view of one embodiment of an auto-ignition cradle in accordance with the present invention.
Figure 5:
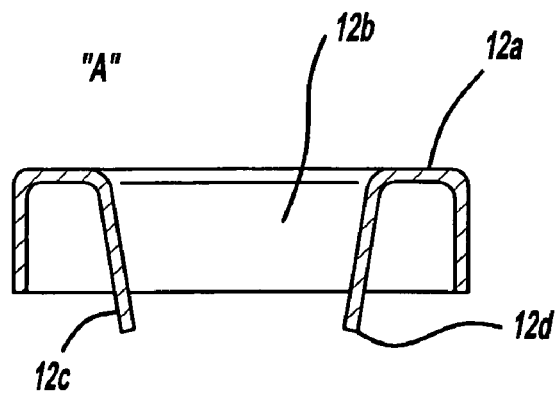
FIG. 5 is a cross-sectional side view of the embodiment of the auto-ignition cradle shown in FIG. 4.

FIGS. 1-3 show an inflator 10 incorporating an auto-ignition cradle 12 in accordance with the present invention. Inflator 10 may be utilized, for example, as a driver side inflator for inflating a driver side airbag. As seen in FIGS. 1-3, inflator 10 includes a housing 14, an annular propellant chamber 16, a quantity of a gas generant material 18 positioned in propellant chamber 16, and an annular filter 20 enclosing propellant chamber 16. Inflator housing 14 is formed by bonding or welding together a first housing portion 22 and a second housing portion 24 in a nested relationship. Second housing portion 24 contains an aperture for receiving an igniter assembly 26 therein. Igniter assembly 26 is welded or otherwise suitably attached to second housing portion 24. A plurality of gas discharge apertures 28 are spaced circumferentially around first housing portion 22 to enable fluid communication between an interior of housing 10 and an exterior of the housing. The first and second housing portions are fabricated (for example, by drawing, stamping, casting, forming, extrusion, or some other suitable process) from a rigid material such as carbon steel or stainless steel.

Gas generant material 18 may be any suitable gas generant composition known in the art, for example, a non-azide composition such as ammonium nitrate. Exemplary, but not limiting formulations are described in U.S. Pat. Nos. 5,872,329, 5,756,929, and 5,386,775. In the embodiment shown, gas generant 18 is provided in tablet form although other forms of gas generant (for example, granules) are contemplated.

Filter 20 comprises a fine wire mesh or other suitable material shaped to form an annulus that is radially positioned and resiliently compressed between an outer wall of and an inner wall of first housing portion 22.

A booster tube 32 is generally cylindrical and contains a quantity of a booster composition 38 ignitable via igniter 36 in a conventional manner to ignite and enhance the burn characteristics of gas generant material 18. A plurality of gas discharge apertures 42 is spaced circumferentially around tube 32 to enable fluid communication between booster composition 38 and gas generant 18. Booster tube 32 is fabricated (for example, by stamping, casting, forming, extrusion, or some other, suitable process) from a rigid material such as carbon steel or stainless steel.

Igniter 36 may be formed as known in the art. One exemplary igniter construction is described in U.S. Pat. No. 6,009,809, herein incorporated by reference. When the igniter assembly is positioned within housing 14, fluid communication between igniter 36 and booster composition 38 is enabled.

Referring to FIGS. 2-5, auto-ignition cradle 12 includes a base portion 12a, an opening 12b formed in the base portion, and at least one resilient member 12c extending from the base portion for maintaining contact with, and exerting a force on, a quantity of a known auto-ignition material 29. Opening 12b is sized to permit insertion of auto-ignition material 29 therethrough from side "A" of the cradle. Member 12c exerts a force on material 29 to position the material between member 12c and another portion of the inflator, such as booster tube 32, housing 14, or another resilient member. In the particular embodiment shown in FIGS. 4 and 5, a pair of resilient members 12c and 12d extend from base portion 12a to position and hold material 29 therebetween.

During assembly of the inflator, sufficient thermal contact between cradle 12 and a thermally-conductive portion of the inflator (for example, housing portion 22) in thermal communication with the inflator exterior is established to help facilitate timely heat transfer from the exterior of the inflator to the cradle and, thence, to auto-ignition material 29. This facilitates timely ignition of material 29 when the inflator is exposed to elevated exterior temperatures. Design criteria such as the contact area and engagement force between auto-ignition material 29 and resilient members 12c, 12d are optimized to facilitate efficient heat transfer from cradle 12 to auto-ignition material 29. These factors may be controlled in a known manner through specification of the cradle material and through control of features such as the thickness of the cradle material, dimensions of the resilient members, the structure of the auto-ignition material, and other factors. In the embodiments shown herein, cradle 12 is configured to seat over an end portion of booster tube 32. However, other methods of mounting the cradle to the inflator are also contemplated. Auto-ignition cradle 12 is fabricated from a thermally-conductive material, such as metal, using known techniques, such as stamping and forming.

A quantity of a known auto-ignition compound 29 is positioned within the inflator 10 so as to enable fluid communication between booster propellant 38 and the auto-ignition compound 29 upon activation of the inflator 10. It will be appreciated that a preferred embodiment will contain an auto-ignition composition 29 not only in fluid communication with but also in physical communication with the booster composition 38. It will also be appreciated that the booster composition 38 and the primary gas generant composition 18 may in fact be one composition as described in co-owned and co-pending application Ser. Nos. 11/497,149, 11/656,319, and 11/809,356, for example, herein incorporated by reference in their entirety.

In a manner known in the art, ignition of booster propellant 38 is produced by ignition of auto-ignition material 29 when material 29 is exposed to elevated temperatures occurring outside the inflator. Ignition of gas generant 18, in turn, is produced by ignition of booster propellant 38. Auto ignition material 29 is a pyrotechnic material which is ignited by exposure to a temperature lower than the ignition temperature of gas generant 22. Auto-ignition material 29 produces a hot gas/particulate effluent when ignited. Suitable auto ignition materials are known to those skilled in the art. Examples of suitable auto-ignition materials are nitro-cellulose based compositions and gun powder.

During assembly of the inflator, cradle 12 is placed over an end portion of booster tube 32 as shown in FIGS. 1-3. Auto-ignition material 29 is inserted through opening 12b in cradle base portion 12a. As inserted, auto-ignition material 29 rests between resilient members 12c, 12d and is in fluid communication with booster composition 38 in booster tube 32. A frame 40 formed from a thermally conductive material is then placed over filter 20 and cradle 12 as shown. Frame 40 is in intimate thermal contact with cradle 12, to facilitate heat transfer therebetween. Referring to FIGS. 2 and 3, as frame 40 is applied to the inflator assembly, the frame exerts pressure on auto-ignition material 29, forcing material 29 deeper into the interior of the inflator between resilient members 12c, 12d and further deflecting the resilient members, thereby increasing the contact forces between material 29 and the resilient members. Thus, the forces exerted on auto-ignition material 29 by frame 40 and by resilient members 12c, 12d act to secure auto-ignition material 29 in position as shown. Housing portion 22 is then secured to housing portion 24 such that intimate thermal contact between housing portion 22 and frame 40 is ensured. Alternatively, pressure on auto-ignition material 29 may be applied by direct contact with housing portion 22 which is secured to housing portion 24 during inflator assembly.

During operation of the inflator, igniter 36 activates upon receiving a signal from a vehicle crash sensing system, producing combustion of booster composition 38 and gas generant 18. Combustion gas flows radially outwardly from propellant chamber 16, then through filter 20, exiting the inflator through the plurality of apertures 28 in inflator housing 14. If the exterior of the inflator is exposed to a vehicle fire or other source of high temperature, heat is transmitted via auto-ignition cradle 12 to auto-ignition material 29, causing material 29 to ignite and resulting in ignition and combustion of the booster composition 38 and gas generant 18, in a manner known in the art.

Figure 7:
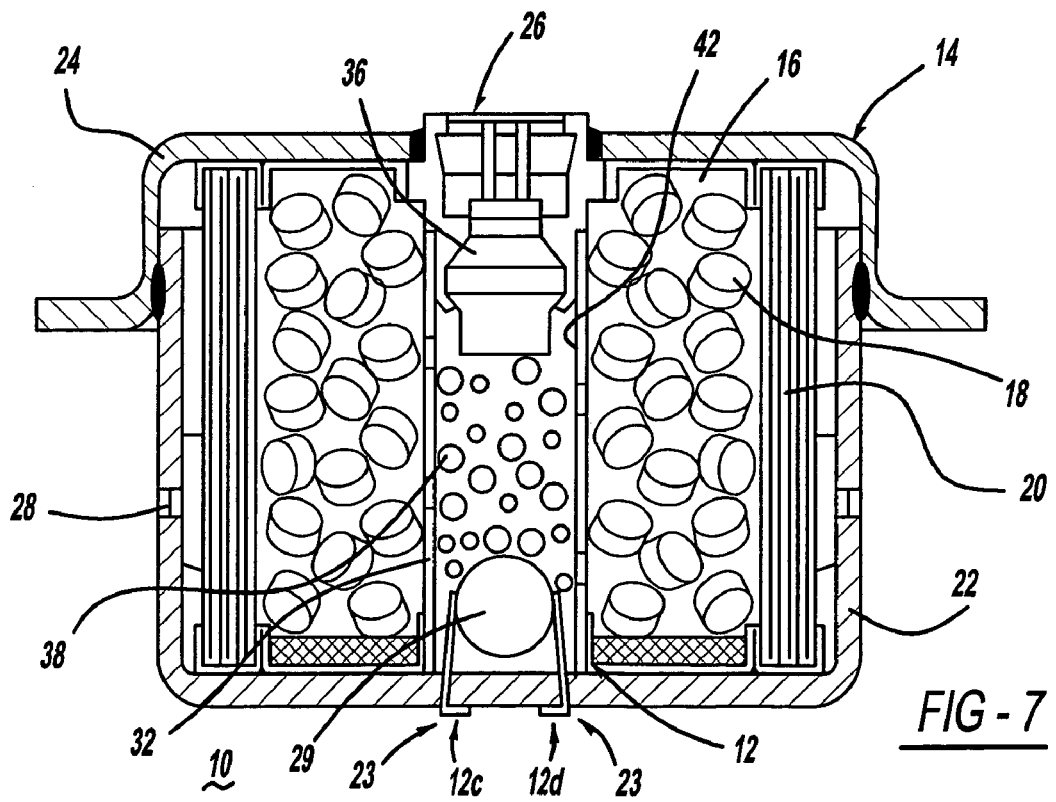
FIG. 7 is yet another embodiment of an inflator of the present invention, whereby the auto-ignition cradle thermodynamically communicates with the exterior of the inflator.

In an alternative embodiment shown in FIG. 7, at least one opening 23 may be formed in housing portion 22 to enable a portion 12c or portions 12c and 12d of cradle 12 to extend through the housing or to otherwise directly expose the cradle 12 to the exterior of the inflator. This obviates the need to ensure intimate thermal contact between the cradle 12, the housing 14, and any intermediate elements (such as frame 40) positioned between the housing 14 and the cradle 12. Stated another way, either design ensures that the auto-ignition cradle 12 operatively communicates with the exterior 11 of the inflator 10 or housing 14, whereby as heat increases about the exterior 11 of the inflator 10, the auto-ignition composition is thermodynamically ignited once the exterior temperature reaches a predetermined threshold.

Figure 6:
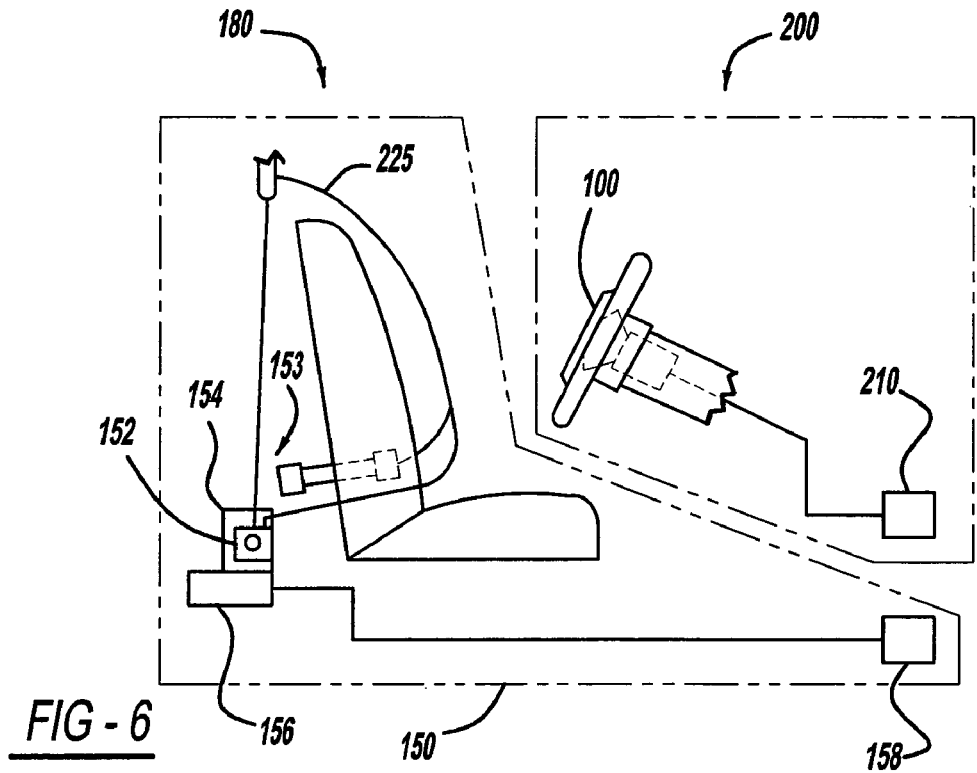
FIG. 6 is a schematic representation of an exemplary vehicle occupant restraint system incorporating an inflator having an auto-ignition cradle in accordance with the present invention.

Referring to FIG. 6, an inflator including the auto-ignition cradle described herein may be incorporated into an airbag system 100, including the inflator 10 and at least one airbag 116 coupled to the inflator so as to enable fluid communication with an interior of the airbag. Airbag system 100 or any of the inflator embodiments described above may also be incorporated into a broader, more comprehensive vehicle occupant restraint system 180 including additional elements such as, for example, a safety belt assembly 150. FIG. 6 shows a schematic diagram of one exemplary embodiment of such a restraint system. Airbag module 100 may be in communication with a crash event sensor 210 which is in communication with a known crash sensor algorithm that signals actuation of airbag module 100 via, for example, activation of igniter 36 (FIGS. 1-3) in the event of a collision.

Safety belt assembly 150 includes a safety belt housing 152 and a safety belt 225 in accordance with the present invention extending from housing 152. A safety belt retractor mechanism 154 (for example, a spring-loaded mechanism) may be coupled to an end portion 153 of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt system 150 may be in communication with a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

While incorporation of the auto-ignition cradle and other principles of the invention have been described herein as applied to a driver side inflator, it should be appreciated that passenger side and other inflators such as side impact inflators may be constructed utilizing an auto-ignition cradle according to the present invention.

It should also be understood that the preceding is merely a detailed description of various embodiments of this invention and that numerous changes to the disclosed embodiments can be made in accordance with the disclosure herein without departing from the spirit or scope of the invention. The preceding description, therefore, is not meant to limit the scope of the invention, but rather illustrates the invention as defined by the appended claims.

What is claimed is:

1. A gas generating system comprising:
    an inflator containing a housing, an interior defined by said housing, said housing also defining an exterior about said inflator;
    a gas generating composition within said interior;
    a booster composition within said interior;
    an auto-ignition composition for igniting said booster composition; and
    an auto-ignition cradle fixed within said interior and extending through said housing to said exterior to facilitate thermodynamic communication between said cradle and said exterior, said cradle containing said auto-ignition composition, wherein said auto-ignition composition is ignitable by heat transferred from said auto-ignition cradle.

2. The gas generating system of claim 1 wherein the auto-ignition cradle physically communicates with said housing to provide thermodynamic communication therewith.

3. A vehicle occupant protection system containing the gas generating system of claim 1.

4. An inflator comprising:
    a housing, an interior defined by said housing, said housing also defining an exterior about said inflator;
    a gas generating composition within said interior;
    a booster composition within said interior;
    an auto-ignition composition for igniting said booster composition; and
    an auto-ignition cradle fixed within said interior and extending through said housing to said exterior to facilitate thermodynamic communication between said cradle and said exterior, said cradle containing said auto-ignition composition.

5. The inflator of claim 4 wherein the auto-ignition cradle physically communicates with said housing to provide thermodynamic communication therewith.

6. A vehicle occupant protection system containing the inflator of claim 4.

7. The inflator of claim 4 wherein said cradle contains a first resilient member and a second resilient member, wherein said auto-ignition composition is constrained between said first and second resilient members.

8. An inflator comprising:
    a housing, an interior defined by said housing, said housing also defining an exterior about said inflator;
    a gas generating composition within said interior;
    a booster composition within said interior;
    an auto-ignition composition for igniting said booster composition; and
    an auto-ignition cradle fixed within said interior and in operative communication with said exterior,
    said housing containing at least one aperture proximate to said cradle, said cradle extending through said at least one aperture thereby providing thermodynamic communication with said exterior of said inflator,
    said cradle containing said auto-ignition composition, wherein said auto-ignition composition is ignitable by heat transferred from said auto-ignition cradle.

* * * * *